United States Patent [19]
Sakuragi

[11] Patent Number: 5,949,165
[45] Date of Patent: Sep. 7, 1999

[54] BRUSHLESS MOTOR ASSEMBLY

[75] Inventor: Katsunori Sakuragi, Yonago, Japan

[73] Assignee: Matsushita Electric Industrial Co., Ltd., Osaka-fu, Japan

[21] Appl. No.: 08/972,616

[22] Filed: Nov. 18, 1997

Related U.S. Application Data

[63] Continuation of application No. 08/772,423, Dec. 23, 1996, abandoned, which is a continuation of application No. 08/512,145, Aug. 7, 1995, abandoned.

[30] Foreign Application Priority Data

Aug. 8, 1994 [JP] Japan .................................. 6-185559

[51] Int. Cl.[6] .............................. H02K 5/15; H02K 5/10

[52] U.S. Cl. ........................... 310/67 R; 310/90; 310/85; 310/89

[58] Field of Search .................... 310/67 R, 90, 310/85, 89

[56] References Cited

U.S. PATENT DOCUMENTS

| | | | |
|---|---|---|---|
| 4,900,958 | 2/1990 | Kitahara et al. | 310/67 R |
| 5,047,677 | 9/1991 | Mineta et al. | 310/67 R |
| 5,061,868 | 10/1991 | Iwazaki et al. | 310/67 R |
| 5,214,326 | 5/1993 | Yonei | 310/67 R |
| 5,241,229 | 8/1993 | Katakura et al. | 310/51 |
| 5,245,234 | 9/1993 | Okada et al. | 310/51 |
| 5,391,952 | 2/1995 | Simazu et al. | 310/67 R |
| 5,396,134 | 3/1995 | Mochizuki | 310/67 R |
| 5,493,157 | 2/1996 | Nakamura | 310/67 R |

*Primary Examiner*—Thomas M. Dougherty
*Assistant Examiner*—K. E. Imayoshi Tamai
*Attorney, Agent, or Firm*—Ratner & Prestia

[57] ABSTRACT

A brushless motor assembly for a magnetic disc drive device includes a bracket for the support of a fixed shaft carrying a stator core at a lower end thereof. A generally cylindrical hollow hub encircles the fixed shaft and carries a rotor magnet at a location confronting the stator core. The bracket is of a size sufficient to protrude into the hollow of the hub and defines a labyrinth seal between an outer peripheral face thereof and an inner peripheral face of a corresponding portion of the hollow of the hub.

4 Claims, 3 Drawing Sheets

BRUSHLESS MOTOR ASSEMBLY

This application is a continuation of application Ser. No. 08/772,423, filed Dec. 23, 1996, (status: now abandoned, which is a continuation of Ser. No. 08/512,145, filed Aug. 7, 1995, status: abandoned).

BACKGROUND OF THE INVENTION

1. Field of the Invention

The present invention generally relates to a disc drive device for driving at least one magnetic storage disc and, particularly, to a brushless motor assembly used in the disc drive device. More particularly, the present invention relates to the brushless motor assembly of a type including a rotor magnet mounted internally of a disc carrier hub for the support of the magnetic storage disc.

2. Description of the Prior Art

With increase in both the handling capacity and the speed of computers, the magnetic storage disc drive device has come to have its operating speed increased from 3,600 rpm to 5,400 rpm and, then, from 5,400 rpm to 6,300 rpm, and yet, the magnetic storage disc drive device operable at a higher speed of, for example, 7,200 rpm is currently developed. On the other hand, disc drive devices for use with 3.5-inch magnetic storage discs have superseded those for use with 8-inch magnetic storage discs and are now likely to supersede those for use with 5-inch magnetic storage discs. Also, to increase the storage capacity, the use has come to be made of a disc array and an MR head. Particularly in the disc drive device utilizing the MR head is employed, the head-to-disc gap is not greater than 0.1 µm when the drive device is in operation with its reliability likely to have reached a limit. For this reason, the design of a disc drive device is required to meet severe requirements such as, for example, minimization of dust from a drive motor used, suppression of grease scattering and outgassing.

The drive motor assembly used in the prior art disc drive device will now be described with reference to FIGS. 5 and 6 which show a longitudinal sectional view and an enlarged longitudinal sectional view of an upper portion of the prior art disc drive device, respectively.

Referring to FIGS. 5 and 6, the prior art disc drive device comprises a generally rectangular cup-like casing having a base plate 28 and opening upwardly and a cover plate 27 closing the top opening of the casing to thereby define a disc chamber 36. The disc drive device shown therein includes a fixed shaft 1 extending between the cover plate 27 and the base plate 28 and having upper and lower bearings 7 and 8 mounted thereon and spaced a distance from each other by means of a spacer sleeve 12. A generally cylindrical hub 2 for the support of a plurality of, for example, six, magnetic storage discs 33 is mounted around the fixed shaft 1 through the upper and lower bearings 7 and 8. The cylindrical hub 2 includes a corresponding number of disc spacers 34 mounted therearound and held in position by means of an annular clamping plate 35 that is secured to an upper end of the cylindrical hub 2 by means of a plurality of set screws 31. Although not shown, the disc drive device also includes magnetic read-write heads one for each of opposite surfaces of each of the magnetic storage discs 33, said read-write heads being supported for movement between retracted and loaded positions in a direction radially of any one of the magnetic storage discs 33.

A generally disc-shaped bracket 3 is fixedly mounted on the base plate 28 by means of a plurality of set screws 30 and has a central portion fixedly supporting a lower end of the fixed shaft 1. The cover plate 27 closing the top opening of the cup-like casing is secured to an upper end of the fixed shaft 1 by means of a set screw 32 with the magnetic storage discs 33 consequently sealed within the casing.

A cylindrical rotor magnet 4 is fixedly secured to an inner surface of a lower end portion of the cylindrical hub 2 for rotation together with the cylindrical hub 2, and a stator core 6 including a coiled winding 5 is positioned radially inwardly of the rotor magnet 4. This stator core 6 is fixedly mounted on a lower holder 13 which is in turn fixedly mounted on a lower end portion of the fixed shaft 1 below the lower bearing 8.

By the presence of a labyrinth seal means effective to reduce a radial gap between the lower holder 13 and the hub 2 and, also, a radial gap between the lower holder 13 and the lower bearing 8, any possible scattering of lubricant grease from the upper and lower bearings 7 and 8 is prevented with the disc chamber 36 consequently kept clean.

Reference numeral 10 represents a biasing spring mounted around the fixed shaft 1 and interposed between the lower bearing 8 and the lower holder 13 for applying a biasing force to the upper and lower bearings 7 and 8.

Fixedly mounted on the bracket 3 and positioned immediately below the rotor magnet 4 and the stator core 6 is a stator substrate 9. This stator substrate 9 has a position detecting element 15 mounted thereon for controlling excitation of the coiled winding 5.

As best shown in FIG. 6, an upper magnetic fluid seal 11 mounted on a seal holder 14 that is fixedly positioned inside the cylindrical hub 2 and above the upper bearing 7 retains a magnetic fluid 16 between it and the fixed shaft 1 to thereby avoid scattering of the lubricant grease from the upper and lower bearings 7 and 8. To fix the magnetic fluid seal 11 in position as mounted on the seal holder 14, a bonding material is deposited at 19 to tightly secure the magnetic fluid seal 11 to the seal holder 14. The bonding material 19 referred to above may preferably be UV-curable resin or thermosetting resin (including epoxy resin). A magnetic fluid protective plate 17 for preventing any possible scattering of the magnetic fluid is mounted on and secured by means of a bonding material, 18 which may be the same as the bonding material 19, to the seal holder 14 so as to overhang the magnetic fluid seal 11.

The cleanness of the motor assembly so constructed as hereinabove described will now be discussed. A splash of grease from the upper and lower bearings 7 and 8 is reduced or shut off by the labyrinth seal means effective to reduce the radial gap between the lower holder 13 and the hub 2 and, also, the radial gap between the lower holder 13 and the lower bearing 8 and the disc chamber 36 is therefore kept clean.

It has, however, been found that the prior art disc drive device has a problem. Since the scattering of the lubricant grease increases with an increase in number of revolutions of the motor used in the drive device, the grease tends to leak from the motor bearings into the disc chamber, where the storage discs are accommodated, when the motor is driven at a high speed. Considering that the cleanness is an ultimate requirement due to the extremely reduced head-to-disc gap, even the slightest leak of the lubricant into the disc chamber results in a head crush or an erroneous information recording or reading. In addition, the prior art disc drive device makes use of a substantial mount of bonding material which poses a problem associated with outgassing. Once this outgassing occurs, the magnetic storage discs may be eroded to such an extent as to eventually result in an occurrence of the head crush.

The use of the substantial amount of the bonding material makes it difficult or complicated to assemble the disc drive device, resulting in increase of the manufacturing cost.

SUMMARY OF THE INVENTION

The present invention has been developed for the purpose of substantially eliminating the foregoing problems inherent in the prior art disc drive device and is intended to provide an improved inexpensive motor assembly for a disc drive device effective to keep a disc chamber clean even though it is driven at a high speed and in which no bonding material is employed to secure the magnetic fluid protective plate in position.

To this end, the brushless motor assembly according to the present invention makes use of two labyrinth seal means, one being similar to the labyrinth seal means employed in the prior art motor assembly discussed above and the other being formed between the inner peripheral surface of the cylindrical hub and an outer peripheral surface of the bracket. Preferably, the magnetic fluid protective plate is mounted in position on the cylindrical hub by means of a mechanical connection.

Thus, according to the present invention, the two labyrinth seal means are employed, rather than the single labyrinth seal means such as employed in the prior art motor assembly, and therefore, the lubricant grease scattering from the bearings can be reduced first by the first labyrinth seal means and then by the second labyrinth seal means. The mechanism therefor is such that a space in which the stator core and the rotor magnet are disposed serves as an acceleration chamber with the labyrinth seals positioned on respective sides of the acceleration chamber to define respective orifices. Flow from the first labyrinth seal (orifice) into a large space (acceleration chamber) results in dissipation of energies of air accompanied by a consequent loss of pressure to such an extent as to avoid any possible leakage. In addition, since the second labyrinth seal is defined by and between the inner peripheral face of that portion of the cylindrical hub to which the rotor magnet is fitted and the outer peripheral face of the bracket, no special machining which would otherwise be involved in forming a labyrinth seal is employed, making it possible to precisely assembly the motor assembly easily.

The use of a mechanical connecting means to secure the magnetic fluid protecting plate eliminates the problem which would otherwise brought about by the use of the bonding material, that is, the problem associated with the outgassing from the bonding material, and therefore, any possible unbalance resulting from an eccentricity and an uneven deposition of the bonding material can satisfactorily be removed.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE EMBODIMENTS

Figure 1:
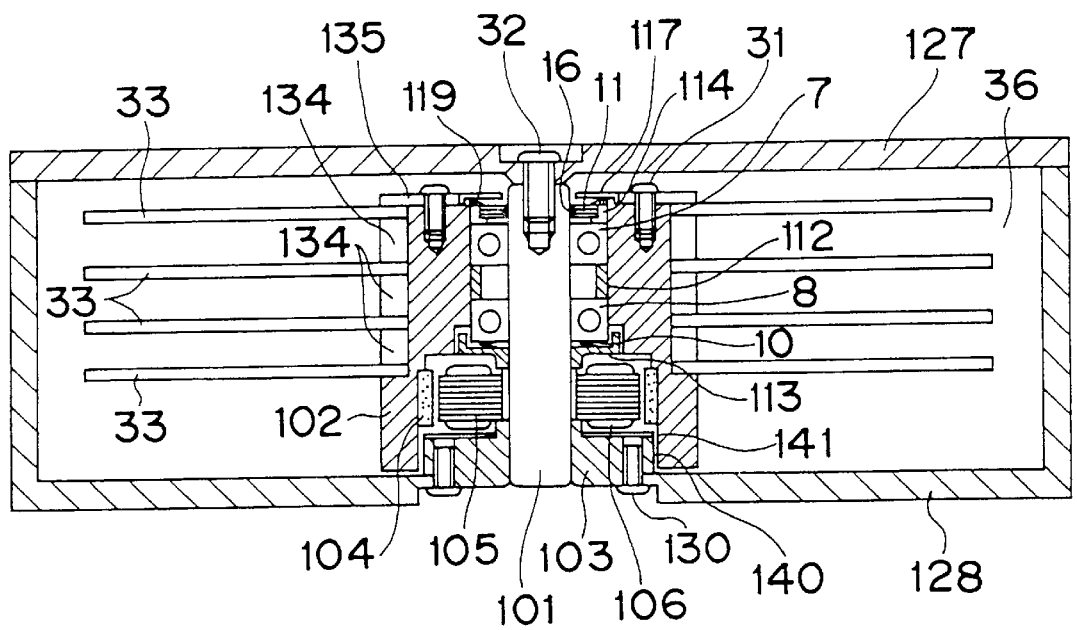
FIG. 1 is a schematic longitudinal sectional view of a brushless motor assembly according to a first preferred embodiment of the present invention.
Figure 2:
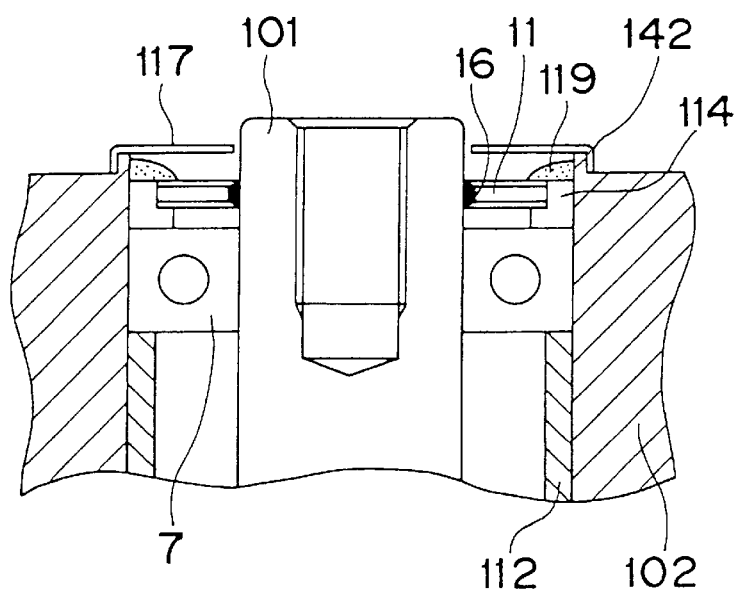
FIG. 2 is a schematic longitudinal sectional view, on an enlarged scale, of a portion of the motor adjacent an upper bearing.

Referring first to FIGS. 1 and 2, a brushless motor assembly according to a first preferred embodiment of the present invention includes a fixed shaft 101 and a spacer sleeve 112 mounted around the fixed shaft 101 and positioned between upper and lower bearings 7 and 8. A cylindrical hollow hub 102 for the support of a plurality of magnetic storage discs 33 includes a corresponding number of disc spacers 134 mounted therearound and held in position by means of an annular clamping plate 135 that is secured to an upper end of the cylindrical hub 102 by means of a plurality of set screws 31. The cylindrical hollow hub 102 shown therein has a longitudinally extending hollow, a lower end portion of which is radially oversized relative to an upper end portion of the hollow in the hub 102.

A generally disc-shaped bracket 103 is fixedly mounted on a base plate 128 by means of a plurality of set screws 130 and has a central portion fixedly supporting a lower end of the fixed shaft 101. A cover plate 127 closing a top opening of a generally rectangular cup-like casing of which the bottom is constituted by the base plate 128 is secured to an upper end of the fixed shaft 101 by means of a set screw 32 with the magnetic storage discs 33 consequently sealed within the casing.

A cylindrical rotor magnet 104 is accommodated within the oversized end portion of the hollow of the hub 102 and is fixedly secured to an inner surface of that end portion of the hollow of the cylindrical hub 102 for rotation together with the cylindrical hub 102, and a stator core 106 including a coiled winding 105 is positioned radially inwardly of the rotor magnet 104. This stator core 106 is fixedly mounted on the bracket 103. A lower holder 113 is fixedly mounted on a generally intermediate portion of the fixed shaft 101 and below the lower bearing 8.

First and second labyrinth seal means are formed in the brushless motor assembly of the present invention. By the presence of a second labyrinth seal means effective to reduce a radial gap between the lower holder 113 and the hub 102 and, also, a radial gap between the lower holder 113 and the lower bearing 8, and a first labyrinth seal means providing a minute gap between an inner peripheral surface 141 of that oversized end portion of the hollow of the hub 102 and an outer peripheral face 140 of the bracket 103, any possible scattering of lubricant grease from the upper and lower bearings 7 and 8 is effectively prevented with the disc chamber 36 consequently kept clean.

Reference numeral 114 represents a magnetic fluid seal holder for retaining an upper magnetic fluid seal 11. This seal holder 114 is accommodated within and fixed in position inside an upper end of the hollow of the hub 102. To fix the magnetic fluid seal 11 in position as mounted on the seal holder 114, a 119 is deposited to tightly secure the magnetic fluid seal 11 to the seal holder 114. The bonding material 119 referred to above may preferably be UV-curable resin or thermosetting resin (including epoxy resin).

A magnetic fluid protective plate 117 for preventing any possible scattering of the 16 is in the form of a cap having a central aperture defined therein for extension of the upper end of the fixed shaft 101 therethrough. This magnetic fluid protective plate 117 is interference-fitted over an annular protrusion 142 protruding axially outwardly from an upper end face of the hub 102 for receiving the protective plate 117. An annular clamping plate 135 has an central aperture of such a size that, when the annular clamping plate 135 is mounted on and secured to the upper end face of the hub 102 by means of the set screws 31, an annular flange of the protective plate 117, fitted under interference over the annular protrusion 142 can be firmly sandwiched between the annular protrusion 142 and an inner peripheral face of the annular clamping plate 135.

The cleanness of the motor assembly so constructed as hereinabove described will now be discussed. Air throttled by the second labyrinth seal is further throttled by the first labyrinth seal in which a loss of pressure takes place in a space (an acceleration chamber) accommodating therein the stator core and the rotor magnet, so that energies of the air are dissipated within the acceleration chamber accompanied by a loss of pressure to such an extent that any leakage no longer take place.

Figure 3:
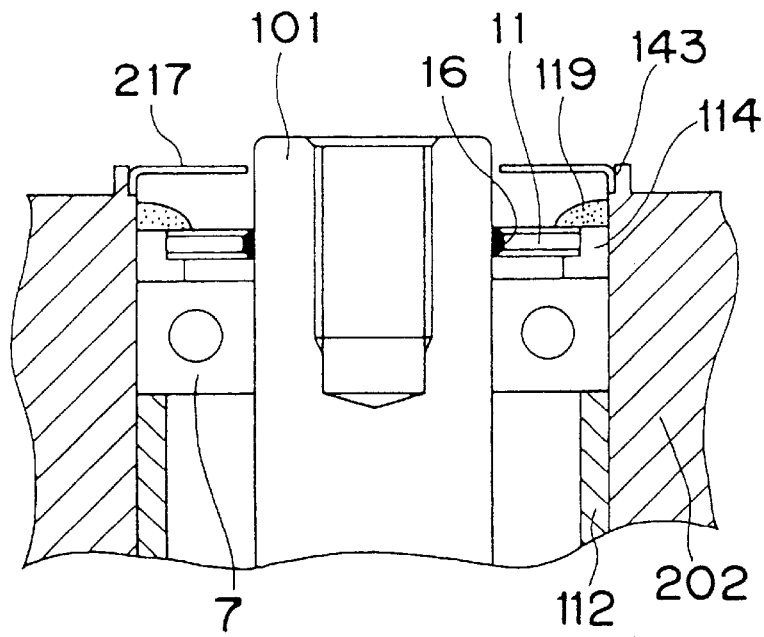
FIG. 3 is a view similar to FIG. 2, showing a second preferred embodiment of the present invention.

In the foregoing embodiment, the protective plate 117 has been shown and described as interference-fitted over the annular protrusion 142 integral with the hub 102. However, in a second preferred embodiment of the present invention shown in FIG. 3, the protective plate shown by 217 and being in the form of a cap as is the case with the protective plate 117 is press-fitted inside an annular protrusion 143 formed integrally with the upper end of the hub 202 so as to protrude axially outwardly therefrom.

Figure 4:
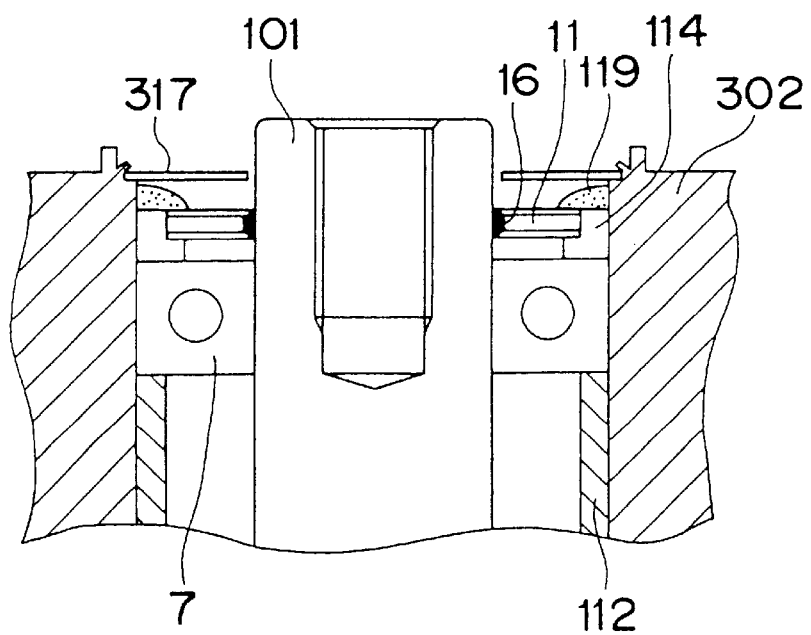
FIG. 4 is a view similar to FIG. 2, showing a third preferred embodiment of the present invention.
Figure 5:
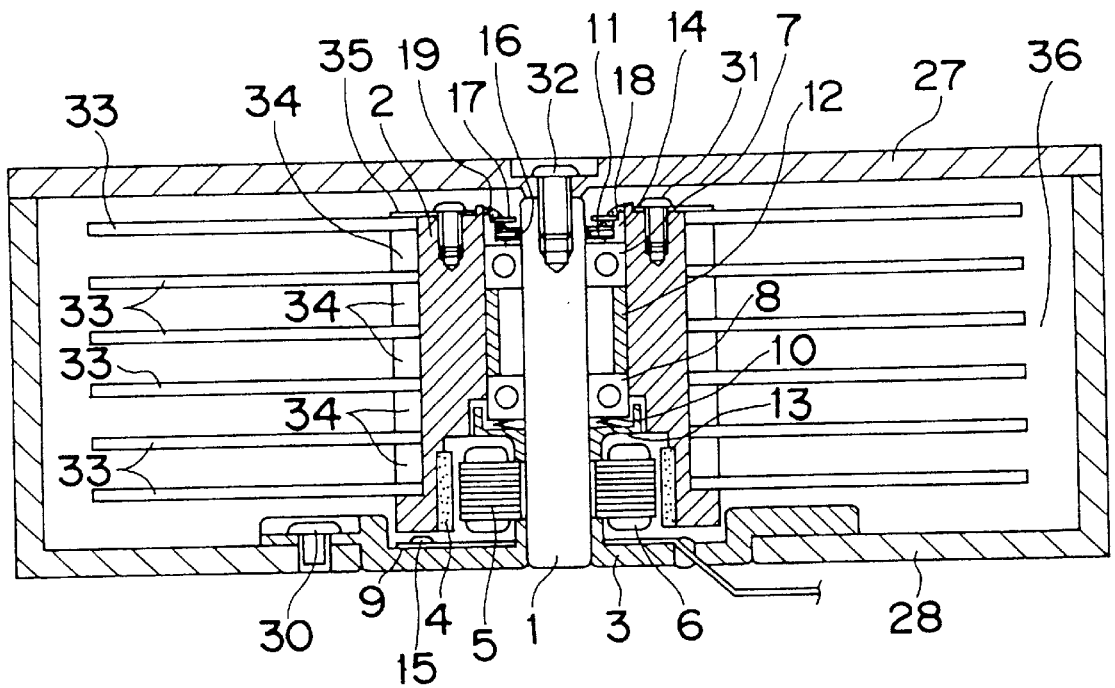
FIG. 5 is a schematic longitudinal sectional view of the prior art brushless motor assembly.
Figure 6:
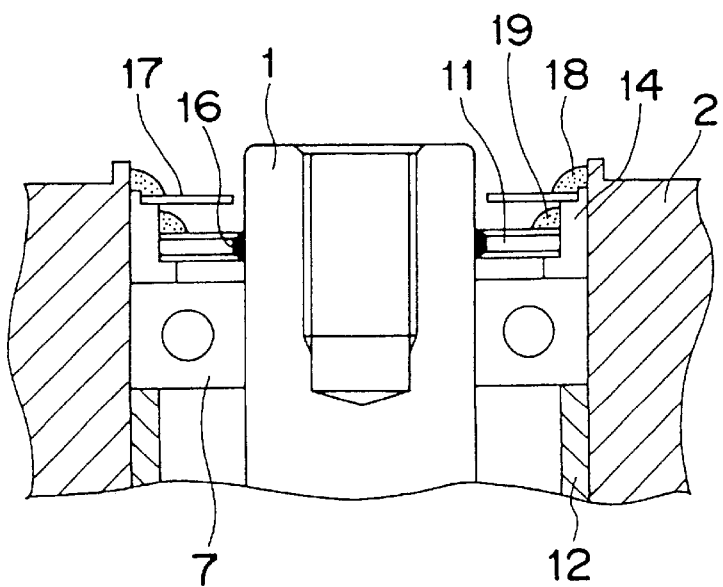
FIG. 6 is a schematic longitudinal sectional view, on an enlarged scale, of a portion of the prior art brushless motor assembly adjacent an upper bearing.

In a third preferred embodiment of the present invention shown in FIG. 4, the protective plate shown by 317 is in the form of an annular flat plate and has its outer peripheral edge staked against an inner peripheral edge portion of the hub 302.

As hereinbefore fully discussed, the provision of the labyrinth seal means between the inner peripheral surface of the cylindrical hub and an outer peripheral face of the bracket is effective to keep the disc chamber clean. Specifically, the present invention effectively works in the case of a high speed motor, and the cleanness of the disc chamber has been found satisfying a class 100 or lower (ICF) for a particle size not smaller than 0.1 $\mu$m. Moreover, it has been found that no special machining which would otherwise be involved in forming a labyrinth seal is employed, making it possible to precisely assemble the motor assembly easily. In addition, since the oversized end portion of the hollow of the hub in which the rotor magnet is accommodated extends axially of the hub, the hub encircles the rotor magnet to minimize the leakage of magnetic fluxes, rendering the motor to be highly reliable.

In addition, since the magnetic fluid protective plate is fixed in position by means of a mechanical connecting means, no bonding material is held in direct contact with the disc chamber such as in the prior art motor assembly, thereby substantially eliminating the problem associated with outgassing. Also, the use of the protective plate does not require any space for installation thereof and a substantially increased span can be secured between the upper and lower bearings.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A brushless motor assembly in a disc drive device including:

(a) a generally cup-like casing having a base plate and a cover plate enclosing a top opening of the casing, and (b) a plurality of magnetic storage discs rotatably enclosed in the casing, said brushless motor assembly comprising:

a shaft extending upward to the cover plate;

a generally cylindrical magnetic material hollow hub within the generally cup-like casing and through which said shaft extends, said hub having an acceleration chamber partially in:

(a) an upper end portion of said hub, and (b) a lower end portion of said hub which is radially oversized relative to said upper end portion, said acceleration chamber formed between:

(a) a first labyrinth seal means within said lower end portion of said hub and defined by:

(1) a bracket substantially within said hub secured to said base plate in coaxial relation to said hub and to which a lower end of said shaft fixed, and (2) an inner peripheral surface of said hub, and (b) a second labyrinth seal means within said upper end portion of said hub and defined by:

(1) a holder element fixed to said shaft within said upper end portion of said hub, and (2) an inner peripheral surface of said hub;

a stator core within said acceleration chamber and having a coiled winding disposed around said shaft;

a rotor magnet within said acceleration chamber and secured to said hub in face-to-face relation with said stator core for rotation with said hub;

a fluid seal at said upper end portion of said hub forming a sealed chamber between said fluid seal and said second labyrinth seal means; and a plurality of bearings within said sealed chamber between said hub and said shaft to permit said hub to rotate relative to said shaft.

2. A brushless motor assembly according to claim 1 further including a magnetic fluid protective plate in proximity to the cover plate and having a central opening within which said upper end portion of said hub is interference-fitted.

3. A disc drive device comprising:

a generally cup-like casing having an opening at the top thereof and a base plate at the bottom thereof;

a cover plate enclosing said opening at the top of said casing;

a shaft extending upward to said cover plate;

a generally cylindrical magnetic material hollow hub within the generally cup-like casing and through which said shaft extends, said hub having an acceleration chamber partially in:

(a) an upper end portion of said hub, and (b) a lower end portion of said hub which is radially oversized relative to said upper end portion, said acceleration chamber formed between:

(a) a first labyrinth seal means within said lower end portion of said hub and defined by:

(1) a bracket substantially within said hub secured to said base plate in coaxial relation to said hub and to which a lower end of said shaft fixed, and
  (2) an inner peripheral surface of said hub, and
(b) a second labyrinth seal means within said upper end portion of said hub and defined by:
  (1) a holder element fixed to said shaft within said upper end portion of said hub, and
  (2) an inner peripheral surface of said hub;
a stator core within said acceleration chamber and having a coiled winding disposed around said shaft;
a rotor magnet within said acceleration chamber and secured to said hub in face-to-face relation with said stator core for rotation with said hub;

a fluid seal at said upper end portion of said hub forming a sealed chamber between said fluid seal and said second labyrinth seal means;
a plurality of bearings within said sealed chamber between said hub and said shaft to permit said hub to rotate relative to said shaft; and
a plurality of magnetic storage discs mounted on an outer periphery of said hub one above another for rotation with said hub.

4. A disc drive device according to claim 3 further including a magnetic fluid protective plate in proximity to said cover plate and having a central opening within which said upper end portion of said hub is interference-fitted.

* * * * *